United States Patent [19]

Stenzel et al.

[11] 4,435,818
[45] Mar. 6, 1984

[54] METHOD AND APPARATUS FOR MONITORING THE MELTING PROCESS IN VACUUM ARC FURNACES

[75] Inventors: Otto Stenzel, Grundau; Pierre Flecker, Alzenau, both of Fed. Rep. of Germany

[73] Assignee: Leybold-Heraeus GmbH, Cologne, Fed. Rep. of Germany

[21] Appl. No.: 381,983

[22] Filed: May 25, 1982

[30] Foreign Application Priority Data

May 26, 1981 [DE] Fed. Rep. of Germany ....... 3120856

[51] Int. Cl.³ .............................................. H05B 7/144
[52] U.S. Cl. ........................................ 373/104; 373/70
[58] Field of Search .................... 373/67, 68, 70, 104, 373/105, 102

[56] References Cited

U.S. PATENT DOCUMENTS 2,907,807 10/1959 Noesen .
3,371,140 2/1968 Wynne ................................. 373/70

FOREIGN PATENT DOCUMENTS 1066039 3/1960 Fed. Rep. of Germany .
1227581 10/1966 Fed. Rep. of Germany .

Primary Examiner—Roy N. Envall, Jr.
Attorney, Agent, or Firm—Felfe & Lynch

[57] ABSTRACT

A method and apparatus for vacuum arc furnaces monitors the arc by spectrum analysis of the arc's light obtained with a radiation receiver. Upon the occurrence of spectrum lines indicating vaporization of the crucible material, the melting process is stopped or adjusted to extinguish the arc burning on the crucible which vaporized the crucible material for the spectrum analysis.

10 Claims, 1 Drawing Figure

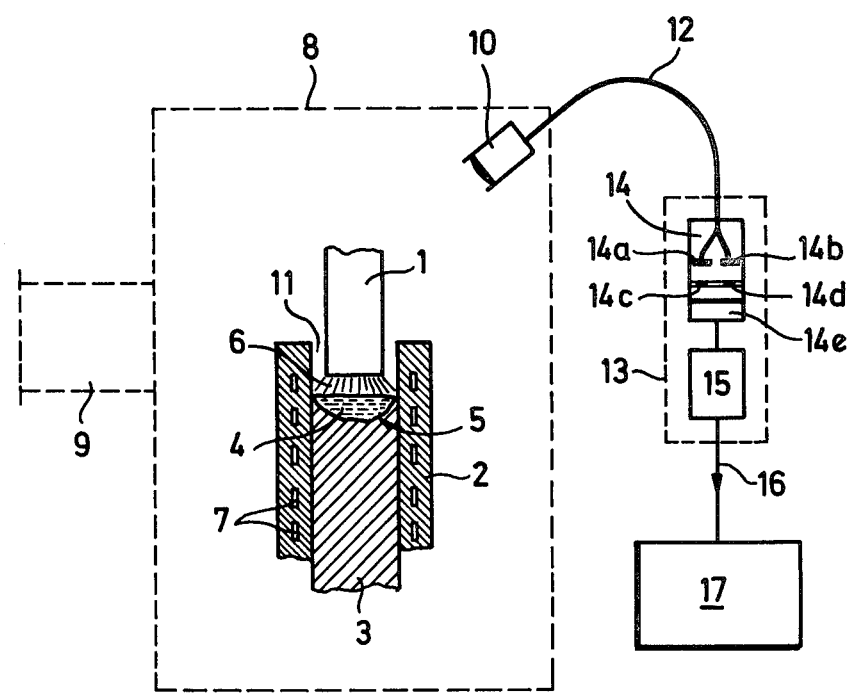

METHOD AND APPARATUS FOR MONITORING THE MELTING PROCESS IN VACUUM ARC FURNACES

The invention relates to a method apparatus for monitoring the melting process in a vacuum arc furnace to prevent crucible breakages when the arc flashes over to the crucible.

From DE-AS 10 66 039, it it known to analyze metallic melts in melting furnaces by forming an arc between the melt and an electrode and dispersing its light spectroscopically. Conclusions regarding the composition of the melt can then be drawn from spectrum analysis. This measure is intended, for example, to influence the composition of the melt in a required manner. In the case of an open arc furnace described in an example of construction, the arcs produced by the furnace electrodes themselves are used for the spectrum analysis. The furnaces described, however, have spectroscopic brick linings so that the danger of fusion of a metallic furnace jacket does not arise.

From DE-AS 12 27 581, it is known to analyze spectroscopically the electromagnetic radiation induced above the metallic melt by electronic bombardment in an electron-beam melting furnace, and thereby to control the operating parameters of the furnace. Electron-beam melting furnaces usually have a water-cooled metal mould and are operated under a vacuum, since the electrons are able to travel a sufficiently great distance between the electron gun and the metallic melt only in vacuum conditions.

Vacuum arc furnaces are used in the remelting of ingots of high-grade steel, super-alloys and reactive metals such as titanium and zirconium. To prevent harmful reactions with the crucible material and to achieve a better ingot structure, it is necessary to cool the crucible. The cooling media used are mainly water or sodium/potassium. Given the high temperatures and power densities that usually occur in the arc, instabilities may occur that lead the arc to flash-over from the melt to the crucible so that the arc then burns between the electrode and the wall of the crucible. This can lead to fusion (fracturing) of the crucible if the electric power is not cut off at the appropriate moment. Monitoring for crucible fractures is normally carried out, at present, on an electrical basis. This is either too inert and insufficiently reliable or an excessively sensitive basis so that the control means switches the furnace off unnecessarily upon each small fluctuation.

Monitoring of this kind, carried out on an electrical basis, is known from US-PS 2 907 807. In this system, the occurrence of excess current from either the formation of a glow-discharge or short-circuiting between furnace parts of differing polarity is detected and analyzed with a possible interruption of the melting operation in mind. However, the arrangement is not capable of detecting the presence of an arc between the fusible electrode and the water-cooled crucible sufficiently promptly to prevent fracturing of the crucible in a reliable manner.

The object of the present invention is, therefore, to provide a method of monitoring the arc cause of fracturing the crucible at an initial stage for initiating a regulating process which suppresses this cause. The process involved is therefore that of quenching an arc to the crucible wall. In the extreme case, this means that the melting operation is interrupted, i.e. the furnace is caused to cease operation.

According to the invention, this object is achieved in that the arc is monitored by spectrumanalysis by means of a radiation receiver and, upon the occurrence of spectrum lines that indicate vaporization of the crucible material, the melting process is adjusted in such manner as to quench the arc burning on the crucible.

In contrast to the prior art methods, the composition of the melt is not intentionally influenced on the basis of the spectroscopic monitoring; instead, the melting process is adjusted or interrupted when the spectrum lines include lines that signal the presence of crucible material in the vapour atmosphere of the furnace. Thus, if the arc impinges upon the mould wall in an intensive manner, then the surface mould material initially fuses or evaporates. The vaporized atoms are optically excited in the arc by the high temperatures and emit an optical spectrum which is characteristic of the material. As a general rule, the spectrum of the mould material differs from the spectrum of the melt itself, so that selected optical lines of both systems can be used for the automatic monitoring process.

In the manner stated above, an arc burning at the wrong place can be signalled before it has caused any damage or, at least, any appreciable damage. Thus, extremely prompt optical monitoring is achieved which, furthermore, becomes operative only when the furnace is actually attacked.

The invention also relates to apparatus for performing the method in combination with a known vacuum arc furnace having a vacuum chamber, a regulating means, a crucible and at least one fusible electrode, between which and a melt contained in the crucible, at least one arc can be established, on to which a radiation receiver having selective properties is directed. The apparatus has an optical analyzing means downstream of the radiation receiver, which analyzing means produces an output signal upon the occurrence of one spectrum line or at least one group of spectrum lines that is characteristic of the crucible material. The output signal of the analyzing means is then passed to the regulating means signal.

An example of the construction of the subject-matter of the invention will now be described in greater detail by reference to the single drawing.

The drawing shows the parts of a vacuum arc furnace that are of importance in the remelting process, namely: a fusible electrode 1 made of the material to be remelted and a water-cooled crucible 2 in which an ingot 3 is built up from the electrode material purified by the remelting process. Located at the upper end of the ingot 3 is a molten pool 4, which communicates with the ingot 3 by way of a substantially parabolic solidification front 5. An arc 6 (or several arcs) burns or burn between the lower end of the fusible electrode 1 and the molten pool 4, to provide the heat for the remelting process. The crucible 2 is provided with a coolant duct 7 through which a liquid coolant circulates. The apparatus so far described form part of the prior art and are therefore not described in detail. The same applies to the vacuum-tight furnace housing 8 and the suction port 9 leading to a vacuum-pump unit.

Arranged in the furnace housing 8 is a radiation (light) receiver 10 aimed at an upper opening 11 of the crucible 2 in which the fusible electrode 1 is positioned. In the illustrated arrangement, the ingot 3 is drawn downwards as it builds up, and the fusible electrode 1, as it is consumed, follows the ingot so that the arc 6 remains at the same place for observation with the aim of the radiation receiver 10.

The radiation signal picked up by the radiation receiver 10 is passed by a photo-conductor 12 to an analyzing means 13 which consists of an analyzer 14 and of a control element 15, the output of which is passed to the regulating means 17 for the furnace.

The analyzer 14 has two replaceable narrow-band filters or monochromators 14a and 14b on to which the light from the photo-conductor is divided. The monochromators are respectively set to a characteristic spectrum line of the crucible material and ingot material. This light, which is allowed through the monochromators, is converted by respective photo-diodes 14c and 14d into respective electrical signal which are passed to a quotient producer 14e. The quotient result is compared with a reference value. As soon as a predetermined threshold value is reached, the control element 15 responds within a few milliseconds. Within wide limits, the fluctuations in the intensity of the signals caused by unfavourable observation angles, contamination of the windows, etc., are automatically corrected by the quotient producer 14e, since the absolute intensity of the lines is not critical, but only their relationship to each other.

EXAMPLE

In apparatus as illustrated in the drawing, the fusible electrode 1 was made of titanium, and the crucible 2 of copper. Copper has pronounced lines in the green and red ranges, and these were used for monitoring purposes. Although titanium has lines in the same range, they could nevertheless be resolved. In the green range use was made of a narrow-band filter in the form of a grid momochromator. In the red range, a continuity monochromator having a resolution of 10 nm was used. For an average wavelength of 810 nm, the copper: titanium signal ratio was approximately 22:1.

In the following Table, the intensities (in arbitrary units) are shown in depedence upon specific wavelengths for the materials, copper and titanium:

| Cu | | Ti | |
|---|---|---|---|
| Intensity (arbitrary units 100) | Wavelength (nm) | Intensity (arbitrary units 100) | Wavelength (nm) |
| 350 | 510.0 | 190 | 511.3 |
| 1500 | 510.5 | 270 | 512.0 |
| 250 | 512.4 | 270 | 514.5 |
| 2000 | 515.3 | 230 | 514.7 |
| 2500 | 521.8 | 210 | 515.2 |
| 1650 | 529.2 | 1100 | 517.3 |
| 1500 | 570.0 | 1300 | 519.2 |
| 1500 | 578.2 | 120 | 520.6 |
| 150 | 580.5 | 1400 | 521 |
| . | | | |
| . | | | |
| 1500 | 793.3 | 30 | 794.9 |
| 1200 | 798.8 | 26 | 796.1 |
| 2000 | 809.2 | 60 | 797.8 |
| | | 9 | 797.9 |
| | | 30 | 799.6 |
| | | 7 | 800.3 |
| | | 55 | 802.4 |
| | | 30 | 806.8 |
| | | 8 | 826.7 |

VARIANTS

For the purpose of monitoring complicated melts or in the case of a frequently changing melt composition, a computer, into which the observed lines can be fed, is associated with the analyzing means. In this arrangement, the light in the analyzing means is distributed on a diode camera by means of a polychromator, for example a prism, in accordance with the differing wavelengths. In the known manner, the diode camera consists of a large number of, e.g. 500 to 2000 photo-diodes, in which the light is converted into electrical signals. A retrieving electronic unit, present in the camera, registers the spectra. These are in turn analyzed in a spectrum analyzer. The spectrum analyzer consists of an analogue-digital converter, a data store, a programme store, a quotient producer and a programmable computer. The results of such analysis are used in a similar manner for controlling the regulating means of the furnace.

We claim:

1. A method of monitoring the melting process in a vacuum arc furnace for preventing breakage of a melt-containing crucible from a radiation- and melt-producing arc therein flashing-over to the crucible, comprising: monitoring the spectrum of the radiation from the arc for the occurrence of at least one line in the spectrum that indicates vaporization of the crucible from the arc flashing over thereto, and thereupon regulating the melting process in such manner as to quench the arc to the crucible.

2. The method of claim 1, wherein monitoring the spectrum of the radiation from the arc comprises:
   providing a radiation receiver inside the vacuum arc furnace for receiving the radiation from the arc;
   providing analyzing means outside the vacuum arc furnace for analyzing the received radiation for the occurrence of the at least one line in the spectrum thereof indicating vaporization of the crucible; and
   conducting the received radiation from the radiation receiver to the analyzing means.

3. The method of claim 2, wherein providing the analyzing means comprises:
   dividing the received radiation conducted to the analyzing means in two;
   providing two monochromators respectively receiving the divided radiation and transmitting therethrough at least one line of the spectrum of the received, divided radiation characteristic, respectively, of the melt and crucible for identifying radiation from the same; and
   comparing the radiation respectively transmitted through the two monochromators for determing the occurrence of at least one line in the spectrum of one thereof which indicates sufficient vaporization of the crucible for regulating the melting process.

4. In a vacuum arc furnace having a vacuum housing, a crucible and an electrode in the vacuum housing, and means producing at least one arc between the electrode and a melt of the electrode material in the crucible for melting the electrode into melt, apparatus for monitoring radiation from the arc for melting the electrode to prevent breaking the crucible with the arc if it flashes over from the melt to the crucible, comprising:
   analyzing means detecting at least one line in the spectrum of the radiation from the arc which is characteristic of the material of the crucible and not the melt for indicating vaporization of the crucible from the arc flashing over to the crucible; and
means responsive to the indicated vaporization of the crucible for quenching the arc to the crucible.

5. The apparatus according to claim 4, wherein the radiation form the arc comprises light and the analyzing means (13) comprises an optical monochromator (14a) which permits the passage of the at least one spectrum line characteristic of the crucible material.

6. The apparatus according to claim 4, wherein the radiation form the arc comprises light and the analyzing means (13) comprises an optical polychromator and an an array of diodes associated therewith in such manner that individual wave-length zones of the polychromated light are passed to individual diodes of the array.

7. The apparatus according to claim 4, wherein the analyzing means comprises:
a pair of monochromators each receiving the radiation from the arc and respectively passing therethrough at least one line in the spectrum of the radiation characteristic, respectively, of the crucible and the melt for identifying radiation from the same; and
means comparing the radiation passed through the monochromators for indicating the vaporization of the crucible.

8. The apparatus according to claim 7, wherein the analyzing means further comprises:
a radiation receiver in the vacuum housing for receiving radiation from the arc; and
a photo conductor for conducting the received arc radiation from the vacuum housing to the pair of monochromators.

9. The apparatus according to claim 7, wherein the means comparing the radiation passed through the monchromators comprises:
a pair of diodes respectively responsive to the radiation passed through the monchromators for producing signals therefrom; and
means comparing the signals for indicating the vaporization of the crucible.

10. The apparatus according to claim 8, wherein the means comparing the radiation passed through the monchromators comprises:
a pair of diodes respectively responsive to the radiation passed through the monchromators for producing signals therefrom; and
means comparing the signals for indicating the vaporization of the crucible.

* * * * *